United States Patent [19]

Walenty

[11] Patent Number: 5,465,210

[45] Date of Patent: Nov. 7, 1995

[54] METHOD FOR DETERMINING A VEHICLE STEERING WHEEL CENTER POSITION

[75] Inventor: Allen J. Walenty, Macomb, Mich.

[73] Assignee: General Motors Corporation, Detroit, Mich.

[21] Appl. No.: 292,642

[22] Filed: Aug. 18, 1994

[51] Int. Cl.⁶ ........................................ B62D 5/04
[52] U.S. Cl. .............................. 364/424.05; 180/79.1; 180/140; 180/142
[58] Field of Search .................... 364/424.05, 559; 180/79.1, 140, 142; 250/231.17

[56] References Cited

U.S. PATENT DOCUMENTS

| | | | |
|---|---|---|---|
| 4,961,474 | 10/1990 | Daido et al. | 180/79.1 |
| 4,979,114 | 12/1990 | Oshita et al. | 364/424.05 |
| 4,996,657 | 2/1991 | Shiraishi et al. | 364/559 |
| 4,999,776 | 3/1991 | Soltis et al. | 364/424.05 |
| 5,032,996 | 7/1991 | Shiraishi | 364/424.05 |
| 5,065,324 | 11/1991 | Oshita et al. | 364/424.05 |
| 5,076,381 | 12/1991 | Daido et al. | 180/79.1 |
| 5,097,918 | 3/1992 | Daido et al. | 180/79.1 |
| 5,121,322 | 6/1992 | Shiraishi et al. | 364/424.05 |
| 5,198,981 | 3/1993 | Collier-Hallman et al. | 364/424.05 |
| 5,203,420 | 4/1993 | Shiraishi | 180/79.1 |
| 5,243,188 | 9/1993 | Hattori et al. | 250/231.17 |
| 5,253,172 | 10/1993 | Ito et al. | 364/424.05 |
| 5,282,135 | 1/1994 | Sato et al. | 364/424.05 |
| 5,283,740 | 2/1994 | Sato et al. | 364/424.05 |
| 5,311,432 | 5/1994 | Momose | 364/424.05 |

*Primary Examiner*—Kevin J. Teska
*Assistant Examiner*—Russell W. Frejd
*Attorney, Agent, or Firm*—Timothy G. Gorbatoff

[57] ABSTRACT

A method for determining the center position of a steering wheel for a vehicle equipped with electric power steering having a brushless motor. Vehicle operating conditions corresponding to a straight direction of vehicle travel are detected. An estimated center position of the brushless motor is determined while the vehicle operating conditions are detected. A range of angular positions about the estimated center position is established in which the actual center position of the steering wheel is determined to be the position of the brushless motor equal to a midpoint of the range of angular positions.

6 Claims, 3 Drawing Sheets

METHOD FOR DETERMINING A VEHICLE STEERING WHEEL CENTER POSITION

The present invention relates to a method for determining a vehicle steering wheel position, and more particularly, to a method for determining a center position of a vehicle steering wheel without the need for a steering wheel position sensor.

BACKGROUND OF THE INVENTION

Vehicle steering wheel position data has application to various vehicle systems. For example, it has been proposed to utilize vehicle steering wheel position for anti-lock braking and active suspension control systems. Accurate vehicle steering wheel position detection requires an initial determination of the steering wheel center position, corresponding to the steering wheel position resulting in a straight direction of vehicle travel. Once known, the absolute angular position of the steering wheel can thereafter be maintained in accordance with the degree of rotation of the steering wheel relative to the center position.

Modern vehicles equipped with electric power steering systems have a brushless DC electric motor which provides torque assist in moving the vehicle wheels in response to rotation of the steering wheel. The amount of torque assist provided by the brushless motor is principally a function of (i) the torque applied by the vehicle operator to the steering wheel, as sensed by a torque sensor contained within the steering system, (ii) brushless motor (rotor) position data supplied by a position sensor contained within the brushless motor housing, and (iii) vehicle speed data supplied by a vehicle speed sensor.

Prior art steering wheel position detection methods require the addition of a separate steering wheel position sensor, responsive to rotation of the steering wheel, for accurately determining the steering wheel center position. Unfortunately, the addition of a steering wheel position sensor increases the cost of the overall steering system.

SUMMARY OF THE PRESENT INVENTION

The present invention relates to a method for determining the center position of a vehicle steering wheel without the need for a separate steering wheel position sensor. Movement of the brushless motor in response to rotation of the steering wheel enables a steering wheel position to be identified in accordance with the position of the brushless motor. Determination of the center position is based only upon inputs from existing vehicle sensors, including the steering wheel torque sensor, electric motor position sensor and vehicle speed sensor. Once identified, the angular rotation of the brushless motor relative to the center position will be a true measure of the absolute angular position of the brushless motor, and thereby the steering wheel.

According to one aspect of the present invention, an angular position of the brushless motor, the torque developed by the steering wheel, and the vehicle speed are sensed by appropriate sensors. Changes in the brushless motor position and the torque developed by the steering wheel over a predetermined time period are determined. To ensure accurate center position detection, the vehicle must first be travelling in a straight direction. This is verified by the following vehicle operating conditions: (i) the sensed vehicle speed is greater than a predetermined vehicle speed, (ii) the change in sensed torque is less than a predetermined change in torque, (iii) the change in the sensed brushless motor position is less than a predetermined change in position, and (iv) the sensed torque is less than a predetermined torque.

Upon verification of the above noted conditions, a positional difference between the sensed brushless motor position and an estimated center position is calculated. The initial value of the estimated center position is a default value. The estimated center position is updated by adjusting its value by a percentage of the calculated positional difference.

According to another aspect of the present invention, once an estimated center position remains unchanged for a predetermined period of time, changes in the position of the brushless motor, which do not invalidate any of the required vehicle operating conditions noted above, are monitored. Because of mechanical "play" in a steering mechanism, a steering wheel can be rotated several degrees about an absolute center position without developing sufficient torque for significant movement of the vehicle wheels. Therefore, a range of brushless motor positions are identified about the estimated center position, all positional values within the range satisfying the vehicle operating conditions for straight direction of vehicle travel. After a predetermined period of time, a maximum span of the range is identified. Thereafter, an actual steering wheel center position is determined to be the position of the brushless motor position at the midpoint of the range of positional values.

According to yet another aspect of the present invention, after a predetermined period of time the span of the range of positional values is thereafter maintained. The maximum and minimum limits of the range are updated by estimated brushless motor center positions exceeding the range. However, the span of the range remains unchanged. That is, if a maximum limit is increased, the minimum limit is increased by the same amount. This results in a floating range of positional values, of which the midpoint is determined to be the actual center position of the brushless motor and steering wheel.

According to yet another aspect of the present invention, the percentage by which the estimated center position is updated is a function of a data validity factor defined as the vehicle speed with respect to a predetermined vehicle speed. The greater the speed of the vehicle, the more likely the positional data will be accurate. Predetermined weighting factors are identified for predetermined ranges of the data validity factor. The greater the weighting factor, the greater percentage of the positional difference is used to update the estimated center position.

BRIEF DESCRIPTION OF THE DRAWINGS

The invention may be best understood by reference to the following detailed description of a preferred embodiment and the drawings in which.

DETAILED DESCRIPTION OF A PREFERRED EMBODIMENT

Figure 1:
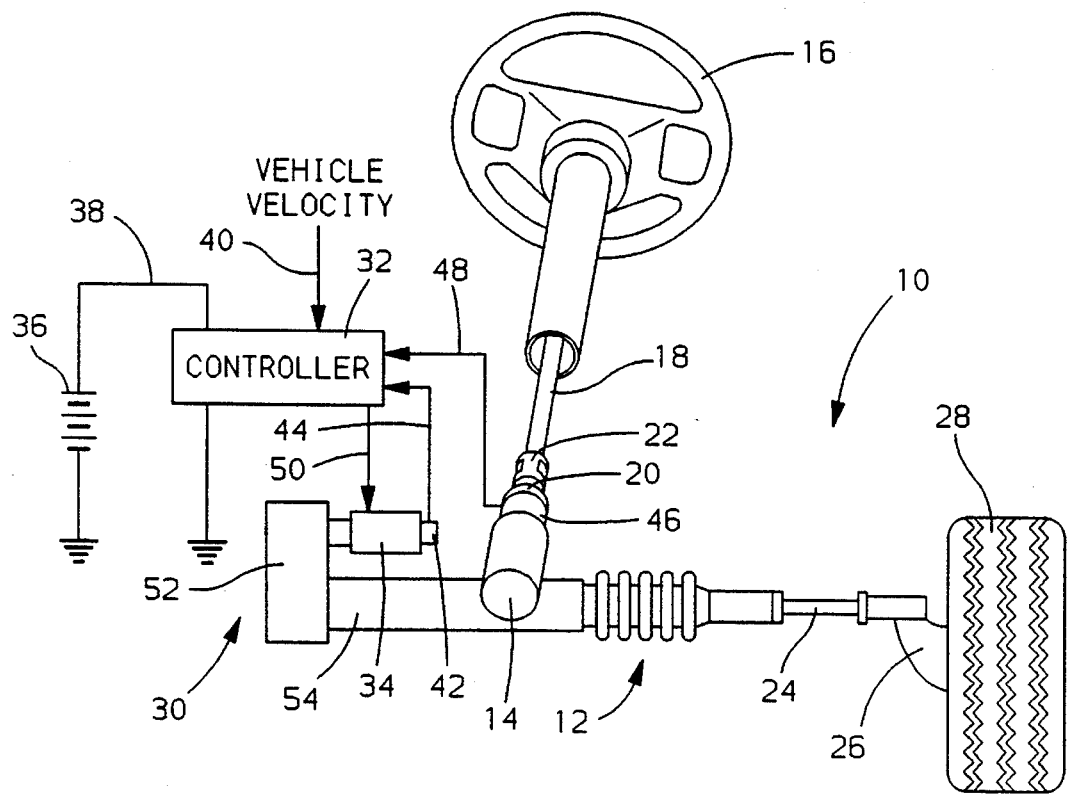
FIG. 1 is a schematic diagram of an electric power steering system including an electronic controller for controlling the vehicle steering for implementation of the present invention.

Referring to the drawings, and more particularly to FIG. 1, reference numeral 10 generally designates a motor vehicle power steering system. The steering mechanism 12 is a rack-and-pinion type system and includes a toothed rack (not shown) and a pinion gear (also not shown) located under gear housing 14. As the steering wheel 16 is turned, the steering shaft 18 rotates the lower steering shaft 20 via a universal joint 22, which turns the pinion gear. Rotation of the pinion gear linearly moves the rack, which moves tie rods 24 (only one shown) in turn moving the steering knuckles 26 (only one shown) which rotate wheels 28 (only one shown).

Electric power steering assist is provided through the unit generally designated by reference numeral 30, including a controller 32 and brushless electric motor 34. The controller 32 takes the form of a standard digital microprocessor along with the standard interface and driver circuits for interfacing and conditioning input and output signals. The controller 32 is powered by the vehicle power supply 36 through line 38. The controller 32 receives a signal representative of vehicle velocity via line 40 from a vehicle speed sensor (not shown). The rotational position of the brushless motor rotor is measured through position sensor 42, which may be an optical encoding type sensor, variable resistance type sensor, or any other suitable type position sensor, and fed to the controller 32 via line 44. In the preferred embodiment, the controller 32 determines the brushless motor rotational velocity by calculating the rate of change of the brushless motor position detected by sensor 42.

As the steering wheel 16 is turned, torque sensor 46 senses the torque applied to the steering wheel 16 by the vehicle operator. The torque sensor 46 may include a torsion bar (not shown) and a variable resistive type sensor (also not shown) which outputs a variable resistance signal to controller 32 via line 48 in relation to the amount of twist on the torsion bar. Although this is the preferable torque sensor, any other suitable torque sensing device will suffice.

The output of the torque sensor is a range of voltages, e.g., 0–5 volts, with a midpoint of the voltage range corresponding to a zero turn angle of the steering wheel. In response to the inputs on lines 40, 44 and 48, the controller 32 sends a current command to the brushless motor 34 via line 50 which supplies torque assist to the steering system through gear box 52. In the gear box 52, the brushless motor 34 preferably turns a gear (not shown) which drives a ball nut (not shown) which moves a ball screw (also not shown) under housing 54, providing torque assist for vehicle steering.

Figure 2A:
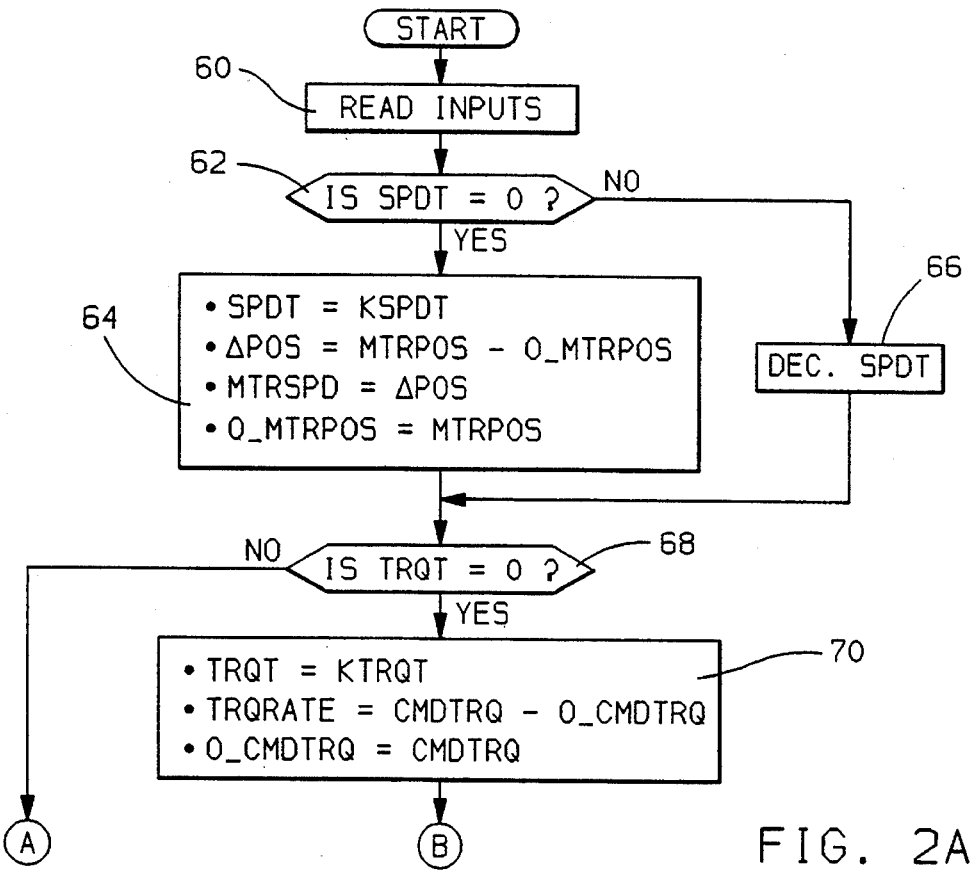
FIGS. 2A–C are flow diagrams illustrating the operation of the electronic controller of FIG. 1 in accord with the principle of the present invention.
Figure 2B:
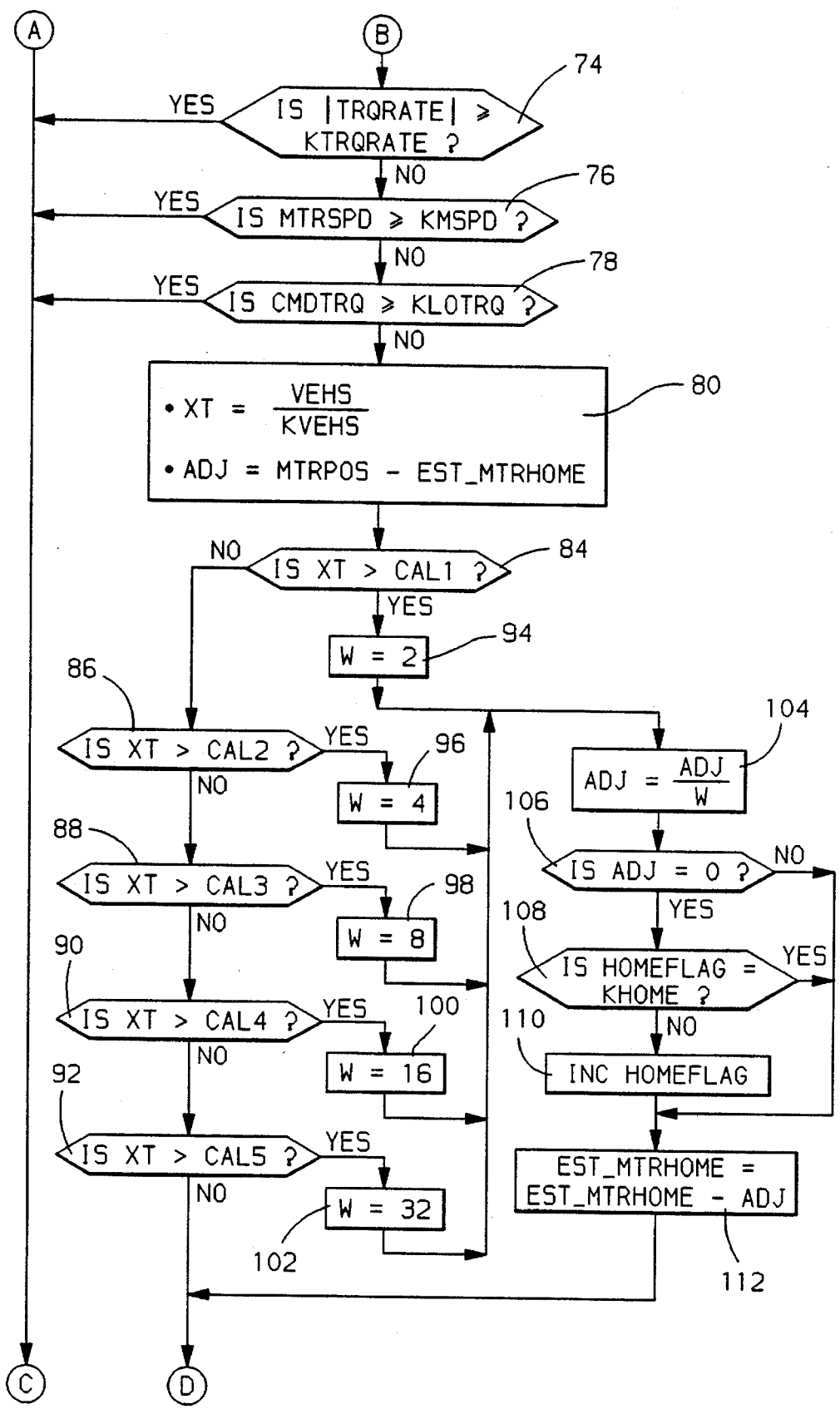
Figure 2C:
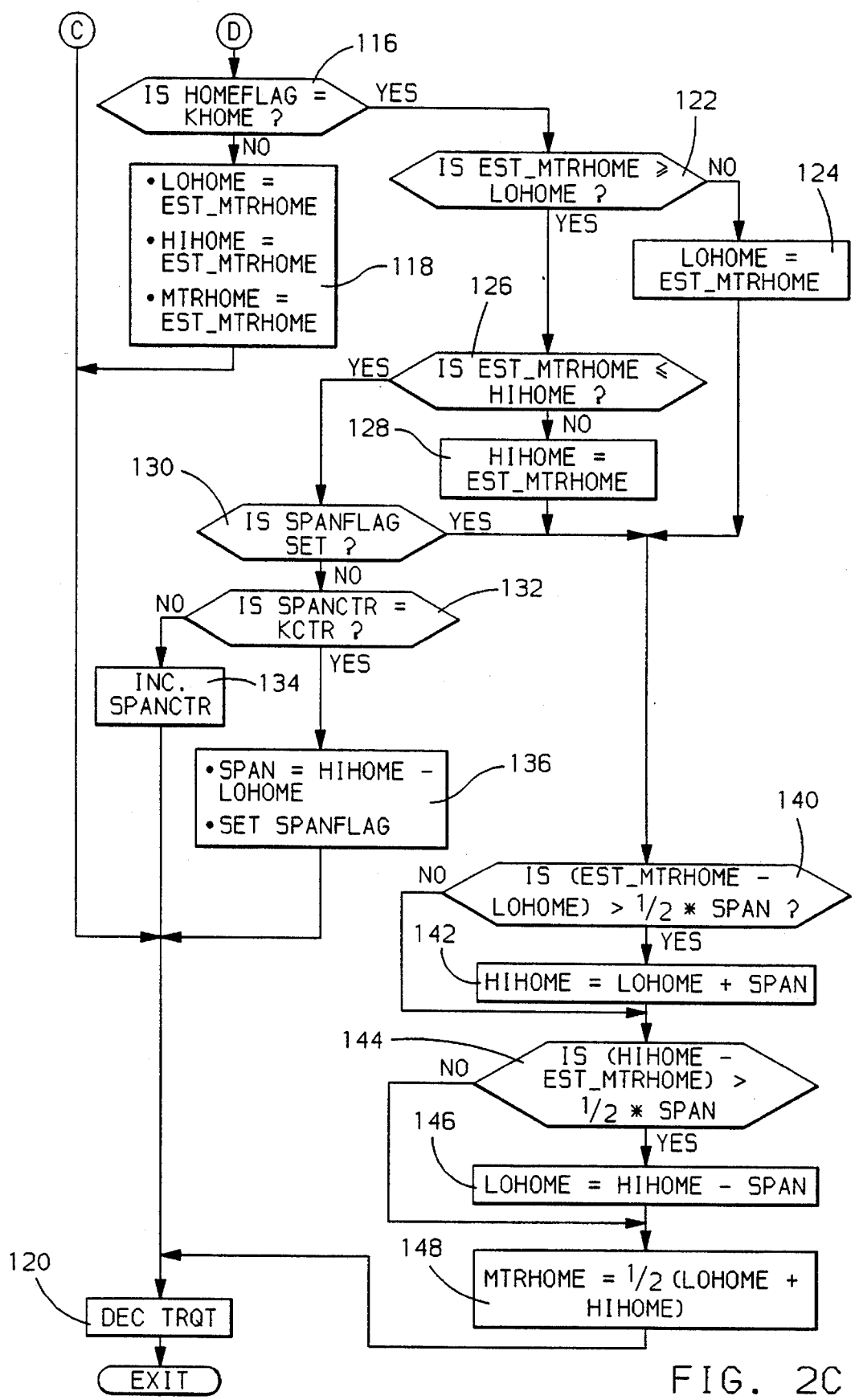

Flow diagrams illustrating the operation of the electronic controller of FIG. 1 in accord with the principle of the present invention are shown in FIGS. 2A–C. The microcomputer contained within the controller 32 has stored therein the program instructions necessary to implement the algorithm as illustrated in FIGS. 2A–C.

Referring back to FIG. 1, when power is first applied to the controller 32 from the vehicle battery 36, the program contained within the controller 32 is initialized. During initialization, appropriate counters and timers are cleared (e.g., SPDT, TRQT and SPANCTR), various random access memory variables are set to calibrated values or zeroed (e.g., HOMEFLAG, EST_MTRHOME, MTRHOME and SPANFLAG), and other conventional functions are performed. This initialization can be designed to occur (i) only upon initial start-up of the vehicle whereupon all appropriate values are saved, (i) upon each start-up of the vehicle whereupon no values are saved, or (iii) upon each start-up whereupon some parameters are saved and others are cleared. After initialization, the controller 32 begins to operate in accordance with its program instructions. Upon the occurrence of a vehicle speed exceeding a predetermined vehicle speed, a control loop is initiated and causes the controller 32 to operate the steering wheel center position algorithm schematically illustrated by the flow diagrams of FIGS. 2A–C.

Referring to FIGS. 2A–C, at step 60 the controller 32 reads the appropriate inputs, comprising the vehicle speed sensor via line 40, the steering wheel torque sensor 46 via line 48, and the brushless motor position sensor 42 via line 44. A brushless motor speed timer SPDT is checked at step 62 to determine whether it has timed-out. If it has, the speed timer SPDT is reset at step 64 to a predetermined value KSPDT.

Additionally, at step 64, a change in the brushless motor position ΔPOS is calculated as a difference between the current brushless motor position MTRPOS, as read in step 60, and the previous brushless motor position O_MTRPOS, as stored in a controller memory register. The calculated change in the brushless motor position ΔPOS is thereafter assigned to the current motor speed MTRSPD.

The time span between successive readings of the brushless motor position (i.e., between MTRPOS and O_MTRPOS) is equal to the scan rate of the controller 32. More properly, motor speed MTRSPD is equal to a change in the brushless motor position ΔPOS divided by the scan rate of the controller 32. However, for purposes of the present invention, assigning to the brushless motor speed MTRSPD a value equal to only the calculated change in brushless motor position ΔPOS is sufficient. Dividing by the scan rate of the controller 32 is not necessary.

Additionally at step 64, the previous brushless motor position O_MTRPOS is set equal to the current brushless motor position MTRPOS and saved in the appropriate controller memory register for use during the next scan (loop) of the algorithm.

If, at step 62, it is determined that the speed timer SPDT has not timed-out, the speed timer SPDT is decremented at step 66 and controller 32 continues execution of the algorithm at step 68. The purpose of having a speed timer SPDT is to limit the updates of brushless motor speed MTRSPD to once every predetermined number of controller scans (KSPDT of step 64), rather than during each one.

At step 68, a steering wheel torque rate timer TRQT is checked to determine whether it has timed-out. If it has not, the torque rate timer TRQT is decremented at step 120 and the controller 32 thereafter exits the routine. If the torque rate timer TRQT has timed-out, it is reset to a predetermined value KTRQT at step 70. Additionally, at step 70, a change in steering wheel torque TRQRATE is calculated as the difference between the current steering wheel torque CMDTRQ and the previous steering wheel torque O_CMDTRQ (i.e., previous steering wheel torque sensor 46 reading). Finally, the previous steering wheel torque O_CMDTRQ is set to the current steering wheel torque CMDTRQ, and stored in an appropriate controller memory register for use during the next scan of the routine. The purpose of having a torque rate timer TRQT is to limit the number of updates of the current steering wheel torque CMDTRQ to once every predetermined number of controller loops (KTRQT of step 70).

At step 74, an absolute value of the change in steering wheel torque TRQRATE is compared with a predetermined change in torque KTRQRATE. If the absolute value of the change in steering wheel torque TRQRATE is greater than or equal to the predetermined change in torque KTRQRATE, the torque rate timer TRQT is decremented at step 120 and the controller 32 thereafter exits the routine.

Otherwise, at step 76, the current brushless motor speed MTRSPD is compared with a predetermined speed KMSPD.

If the current brushless motor speed MTRSPD is greater than or equal to the predetermined speed KMSPD, the torque rate timer TRQT is decremented at step 120 and the controller 32 thereafter exits the routine. Otherwise, at step 78, the current steering wheel torque CMDTRQ, reflecting the torque being applied to the steering wheel by the vehicle operator, is compared to a predetermined torque KLOTRQ.

If the current steering wheel torque CMDTRQ is greater than or equal to the predetermined torque KLOTRQ, the torque rate timer TRQT is decremented at step 120 and the controller 32 thereafter exits the routine. Otherwise, the controller 32 continues execution of the routine at step 80.

The conditions at steps 74, 76 and 78 reflect three vehicle operating conditions which must exist before the controller 32 will ultimately determine the steering wheel center position. These vehicle operating conditions help to insure that the vehicle is travelling in a relatively straight direction so that the sensors, as read by the controller 32, will accurately reflect an operating condition corresponding to the center position of the steering wheel. Recall that additionally, the vehicle speed must exceed a predetermined speed before the controller 32 will execute the algorithm of the present invention.

At step 80, an adjustment value ADJ is calculated as the difference between the current brushless motor position MTRPOS and an estimated brushless motor center position EST_MTRHOME. The adjustment value ADJ is a signed value, being either positive or negative, depending upon the comparative values of the brushless motor position MTRPOS and the estimated brushless motor center position EST_MTRHOME. During the initial operation of this routine by the controller 32, the value of the estimated brushless motor center position EST_MTRHOME is a default value selected during initialization. Operation of the routine adjusts this estimate. Therefore, subsequent operations of the routine will utilize an updated estimated brushless motor center position EST_MTRHOME value calculated at step 112.

Additionally at step 80, a data validity factor XT is calculated as the current vehicle velocity VEHS divided by a predetermined vehicle velocity KVEHS. The higher the current vehicle velocity VEHS, the more likely the vehicle is travelling in a straight direction. The value of the predetermined vehicle velocity KVEHS is selected to reflect a velocity at which it would be highly unlikely for the vehicle to be travelling in other than a straight direction. Therefore, the closer the actual vehicle velocity VEHS is to the predetermined vehicle velocity KVEHS, the greater the degree of confidence the controller 32 has in the accuracy of the calculated adjustment value ADJ, and the greater the value of the data validity factor XT.

The affect of the data validity factor XT value can be seen with regards to steps 84-102. In steps 84, 86, 88, 90 and 92, the data validity factor XT value of step 80 is compared to predetermined data validity calibration values CAL1-5, arranged linearly with CAL1 having the maximum value and CAL5 having the minimum value. Depending upon the value of the data validity factor XT, an appropriate weighting factor W is selected at steps 94, 96, 98, 100 and 102. The weighting factors W are arranged linearly with the value of the weighting factor of step 94 having the minimum value and the weighting factor of step 102 having the maximum value.

At step 104, the adjustment value ADJ is updated by dividing itself by the weighting factor W. At step 112, the value of the estimated brushless motor center position EST_MTRHOME is updated by subtracting the updated adjustment value ADJ of step 104. In accordance with steps 80-102 described above, the greater the vehicle speed VEHS, the greater the data validity factor value XT, and the greater a percentage of the initial adjustment value ADJ of step 80 is subtracted from the estimated brushless motor center position EST_MTRHOME.

At step 106, the adjustment value ADJ of step 104 is compared to a value of zero. If the adjustment value ADJ is equal to zero, at step 108 a counter HOMEFLAG is compared to a predetermined counter value KHOME. If the value of the counter HOMEFLAG is not equal to the predetermined value KHOME, the counter HOMEFLAG is incremented at step 110. If either the adjustment value ADJ is not equal to zero at step 106, or the counter HOMEFLAG is not equal to the predetermined value KHOME at step 108, the controller 32 continues execution of the routine at step 112.

The purpose of the HOMEFLAG counter is to require that the current brushless motor position MTRPOS and the estimated brushless motor center position EST_MTRHOME be identical for a predetermined period of time equal to a predetermined number of controller scans (KHOME of step 108). This is to insure that an accurate center position of the steering wheel is identified. Until such time as counter HOMEFLAG equals the predetermined value KHOME, as determined by step 116, step 118 assigns to variable parameters LOHOME and HIHOME, and the actual brushless motor center position MTRHOME a value of the estimated brushless motor center position EST_MTRHOME of step 112. Then, at step 120 the torque rate timer is decremented and the controller 32 thereafter routine exits.

Once the value of the estimated brushless motor center position EST_MTRHOME of step 112 remains the same for a predetermined period of time (KHOME of step 108), an accurate estimate of the actual center position of the steering wheel has been identified. However, the estimated brushless motor center position EST_MTRHOME is sensitive to constant drifting due to mechanical "play" within the steering mechanisms. All brushless motor positions MTRPOS within a finite range about the estimated brushless motor center position EST_MTRHOME will satisfy the vehicle operating conditions of steps 74, 76 and 78. Therefore, the low LOHOME and high HIHOME boundaries of the finite range (dead zone) about the estimated brushless motor center position EST_MTRHOME must be identified.

At step 122, the value of the estimated brushless motor center position EST_MTRHOME is compared to the lowest center position previously detected LOHOME. Initially, the value of the lowest center position LOHOME will be the value assigned at step 118. If the estimated brushless motor center position EST_MTRHOME is not greater than or equal to the lowest center position LOHOME, the lowest center position LOHOME is updated by assigning to it the value of the estimated brushless motor center position EST_MTRHOME. The controller 32 then continues execution of the routine at step 140.

If the estimated brushless motor center position EST_MTRHOME is greater than or equal to the lowest center position LOHOME, determined at step 122, the estimated brushless motor center position EST_MTRHOME is compared at step 126 to the highest center position previously detected HIHOME. Initially, the value of the highest center position HIHOME will be the value assigned at step 118. If the estimated brushless motor center position EST_MTRHOME is not less than or equal to the highest center position HIHOME, step 128 updates the highest center position HIHOME to the value of the estimated brushless motor center position EST_MTRHOME. The controller 32 then continues operation of the routine at step 140.

If the estimated brushless motor center position EST_MTRHOME is less than or equal to the highest center position HIHOME, the controller 32 looks at step 130 to determine whether a variable SPANFLAG has been set to 1. SPANFLAG is a flag which, when set, indicates that the estimated brushless motor center position EST_MTRHOME, despite being updated during each loop of the routine, has remained within the range of values identified by a minimum and maximum center position, LOHOME and HIHOME, respectfully. When such is the case, the controller 32 continues operation of the routine at step 140.

Until the SPANFLAG is set at step 130, the routine continues at step 132 in which a counter SPANCTR is compared to a predetermined value KCTR. If the value of counter SPANCTR is not equal to the predetermined value KCTR, the counter SPANCTR is incremented at step 134, with the controller 32 continuing execution of the routine at step 120. If the SPANCTR is equal to the predetermined value KCTR at step 132, step 136 assigns to a variable parameter SPAN a value equal to the difference between the highest HIHOME and lowest LOHOME center positions. Additionally, at step 136, the SPANFLAG is set to a value of 1, and controller 32 continues execution at step 120. The value of SPAN is thereafter maintained (i.e., the size of the finite range will remain constant) although the minimum and maximum center positions LOHOME and HIHOME may vary depending upon the estimated brushless motor center position EST_MTRHOME, resulting in a floating center range of values.

The purpose of the SPANCTR is to insure that a stable finite range (or dead band) SPAN about the estimated brushless motor center position EST_MTRHOME had been identified. Once the size of the finite range SPAN has been identified, it will remain constant. However, the entire range may drift, as will be described below with reference to steps 140–146.

Referring back to step 130, once the SPANFLAG has been set in step 136, the next loop of the routine results in the controller 32 continuing operation at step 140 directly from step 130, or alternatively, from steps 124 and 128. At step 140, if the span of values between the estimated brushless motor center position EST_MTRHOME and the lowest center position LOHOME is greater than one-half the finite range SPAN, the highest center position HIHOME is adjusted by a corresponding amount to maintain a total finite span SPAN between the lowest LOHOME and the highest HIHOME center position. This is achieved in step 142 by assigning to the highest center position HIHOME a value equal to the lowest center position LOHOME plus the finite span SPAN.

Similarly, at step 144, if the span of values between the highest center position HIHOME and the estimated brushless motor center position EST_MTRHOME is greater than one-half the finite range SPAN, the lowest center position LOHOME is adjusted by a corresponding amount to maintain a total finite span SPAN between the lowest LOHOME and highest HIHOME center position. This is achieved in step 146 by assigning to the lowest center position LOHOME a value equal to the highest center position HIHOME minus the finite span SPAN.

Finally, at step 148, the controller 32 determines an updated actual brushless motor (and thereby steering wheel) center position MTRHOME as the midpoint of the finite range SPAN. The controller 32 continues execution at step 120 by decrementing the torque rate timer TRQT, and exits the routine.

Although not illustrated in the drawings, several diagnostic features may be incorporated with this algorithm. For example, a "SERVICE STEERING" telltale in the vehicle instrument panel could be illuminated if the steering wheel center position MTRHOME drifts more than a predetermined number of degrees from a default center position.

While the present invention has been described in reference to the illustrated embodiments, it will be recognized that various modifications will occur to those skilled in the art. In this regard, it will be understood that methods incorporating such modifications may fall within the scope of this invention, which is defined by the appended claims.

The embodiments of the invention in which an exclusive property or privilege is claimed are defined as follows:

1. A method for determining a center position of a steering wheel for a vehicle equipped with electric power steering having a brushless motor, the method comprising:

detecting vehicle operating conditions corresponding to a straight direction of vehicle travel;

estimating a center position of the brushless motor when the vehicle operating conditions are detected;

establishing a range of angular positions of the brushless motor about the estimated center position, the range having a minimum and maximum position; and determining the center position of the steering wheel as an angular position of the brushless motor equal to a midpoint of the range of angular positions.

2. The method according to claim 1, wherein detecting vehicle operating conditions corresponding to a straight direction of vehicle travel comprises:

sensing an angular position of the brushless motor;

sensing a torque developed by the steering wheel;

sensing a vehicle speed;

determining a change in the sensed angular position of the brushless motor over a first predetermined time period;

determining a change in the sensed torque developed by the steering wheel over a second predetermined time period; and detecting a straight direction of vehicle travel when (i) sensed vehicle speed is greater than a predetermined vehicle speed, (ii) the change in sensed torque is less than a predetermined change in torque, (iii) the change in sensed angular position of the brushless motor is less than a predetermined change in angular position, and (iv) sensed torque is less than a predetermined torque.

3. The method according to claim 1, wherein establishing a range of angular positions of the brushless motor about the estimated center position comprises:

determining whether the estimated center position is one of less than the minimum position and greater than the maximum position of the range of angular positions;

equating the minimum position with the estimated center position when the estimated center position is less than the minimum limit; and equating the maximum position with the estimated center position when the estimated center position is greater than the maximum limit.

4. The method according to claim 1, further comprising:

determining a difference between the center position of the steering wheel and a predetermined center position; and indicating when the difference between the center position of the steering wheel and a predetermined center position is greater than a predetermined difference.

5. The method according to claim 3, further comprising:

identifying a finite span of the range of angular positions as a difference between the minimum and maximum angular positions when the difference between the minimum and maximum angular positions remains unchanged over a predetermined time period; and limiting the range of angular positions to the finite span.

6. The method according to claim 1, further comprising:

sensing an angular position of the brushless motor;

sensing a vehicle speed; and updating the estimated center position by a percentage of a difference between the sensed angular position of the brushless motor and the estimated center position, the percentage being a function of the sensed vehicle speed with respect to a predetermined vehicle speed.

* * * * *